US012541165B2

(12) United States Patent
Morikami et al.

(10) Patent No.: US 12,541,165 B2
(45) Date of Patent: Feb. 3, 2026

(54) IMAGE FORMING APPARATUS THAT CAN ADJUST THE TIMING OF PERFORMING IMAGE DENSITY CORRECTION

(71) Applicant: KYOCERA Document Solutions Inc., Osaka (JP)

(72) Inventors: Ayato Morikami, Osaka (JP); Yasuaki Sakamoto, Osaka (JP); Masaru Watanabe, Osaka (JP); Yukiko Kotani, Osaka (JP); Atsuki Ito, Osaka (JP); Makoto Matsumoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 35 days.

(21) Appl. No.: 18/639,257

(22) Filed: Apr. 18, 2024

(65) Prior Publication Data

US 2024/0353783 A1 Oct. 24, 2024

(30) Foreign Application Priority Data

Apr. 20, 2023 (JP) ................................ 2023-069367

(51) Int. Cl.

| | |
|---|---|
| ***G03G 15/00*** | (2006.01) |
| ***G03G 15/043*** | (2006.01) |
| ***G03G 15/06*** | (2006.01) |

(52) U.S. Cl.

CPC ....... *G03G 15/5041* (2013.01); *G03G 15/043* (2013.01); *G03G 15/065* (2013.01);

(Continued)

(58) Field of Classification Search

CPC ............. G03G 15/5041; G03G 15/043; G03G 15/065; G03G 15/5045; G03G 15/5062;

(Continued)

(56) References Cited

U.S. PATENT DOCUMENTS

2007/0065164 A1* 3/2007 Fujimori ........... G03G 15/5058 399/49

2011/0304887 A1* 12/2011 Nakase ............. G03G 15/5033 358/3.24

(Continued)

FOREIGN PATENT DOCUMENTS

JP 2009-232001 A 10/2009

JP 2010-008587 A 1/2010

*Primary Examiner* — Stephanie E Bloss

*Assistant Examiner* — Laura Roth

(74) *Attorney, Agent, or Firm* — Stein IP, LLC

(57) ABSTRACT

An image forming apparatus includes an image forming portion, an exposure device, an image density sensor, and a control portion. The control portion can, by adjusting the development voltage based on the image density of a reference image and the amount of exposure from the exposure device, perform image density correction to adjust the image density. The control portion predicts the toner charge amount based on a formation condition of the reference image and the image density of the reference image and determines the timing of performing the image density correction next time based on the rate of change of the toner charge amount calculated using a first toner charge amount predicted when the image density correction was performed last time, a second toner charge amount predicted when the image density correction is performed this time, and the interval between the image density correction performed last time and this time.

3 Claims, 5 Drawing Sheets

(52) U.S. Cl.
CPC ..... *G03G 15/5045* (2013.01); *G03G 15/5062* (2013.01); *G03G 15/55* (2013.01); *G03G 2215/00042* (2013.01); *G03G 2215/00084* (2013.01); *G03G 2215/047* (2013.01)

(58) Field of Classification Search
CPC ......... G03G 15/55; G03G 2215/00042; G03G 2215/00084; G03G 2215/047; G03G 15/5058; G03G 15/5054; G03G 21/20; G03G 2215/0007
See application file for complete search history.

(56) References Cited

U.S. PATENT DOCUMENTS

| | | | | |
|---|---|---|---|---|
| 2020/0103785 | A1* | 4/2020 | Shimizu | G03G 15/065 |
| 2021/0041802 | A1* | 2/2021 | Shimizu | G03G 15/065 |

* cited by examiner

IMAGE FORMING APPARATUS THAT CAN ADJUST THE TIMING OF PERFORMING IMAGE DENSITY CORRECTION

INCORPORATION BY REFERENCE

This application is based on and claims the benefit of priority from Japanese Patent Application No. 2023-069367 filed on Apr. 20, 2023, the contents of which are hereby incorporated by reference.

BACKGROUND

The present disclosure relates to image forming apparatuses using an electrophotographic process, and relates in particular to a method of determining the timing of performing image density correction.

In electrophotographic image forming apparatuses, the image density of the formed image may change due to changes in photosensitive material and toner over time, changes in the temperature and humidity around the image forming apparatuses. Conventionally, techniques have been developed to perform image density correction (calibration) at a predetermined timing to stabilize image formation against the above mentioned changes.

In this image density correction, the charging voltage, the developing voltage, the amount of exposure, the gradation characteristics processing (gamma correction), and the like are adjusted to be optimal for output of the target image density. However, the tendency and progress of the change of the image density differs depending on the environment of use of the image forming apparatus and the printing conditions. Thus, if image density correction is performed at intervals determined in advance based on design data, image density correction is often performed at non-optimal timings.

SUMMARY

According to one aspect of the present disclosure, an image forming apparatus includes an image forming portion, an exposure device, an image density sensor, and a control portion. The image forming portion has an image carrier that has a photosensitive layer formed on its surface, a charging device that charges the surface of the image carrier, and a development device that has a developer carrier carrying developer including toner and that develops an electrostatic latent image formed on the image carrier into a toner image. The image forming portion performs image formation using the toner. The exposure device forms the electrostatic latent image with an attenuated electric charge by exposing to light the surface of the image carrier charged by the charging device. The image density sensor detects the density of the toner image formed in the image forming portion. The control portion controls the image forming portion and the exposure device. The control portion can, by detecting with the image density sensor the image density of a reference image for image density correction formed in the image forming portions and adjusting the development voltage fed to the developer carrier and the amount of exposure from the exposure device based on the result of the detection, perform image density correction to adjust the image density in the image forming portion. When performing the image density correction, the control portion predicts the toner charge amount based on a formation condition of the reference image and the image density of the reference image detected by the image density sensor and determines the timing of performing the image density correction next time based on the rate of change of the toner charge amount calculated using a first toner charge amount predicted when the image density correction was performed last time, a second toner charge amount predicted when the image density correction is performed this time, and the interval between the image density correction performed last time and this time.

DETAILED DESCRIPTION

Figure 1:
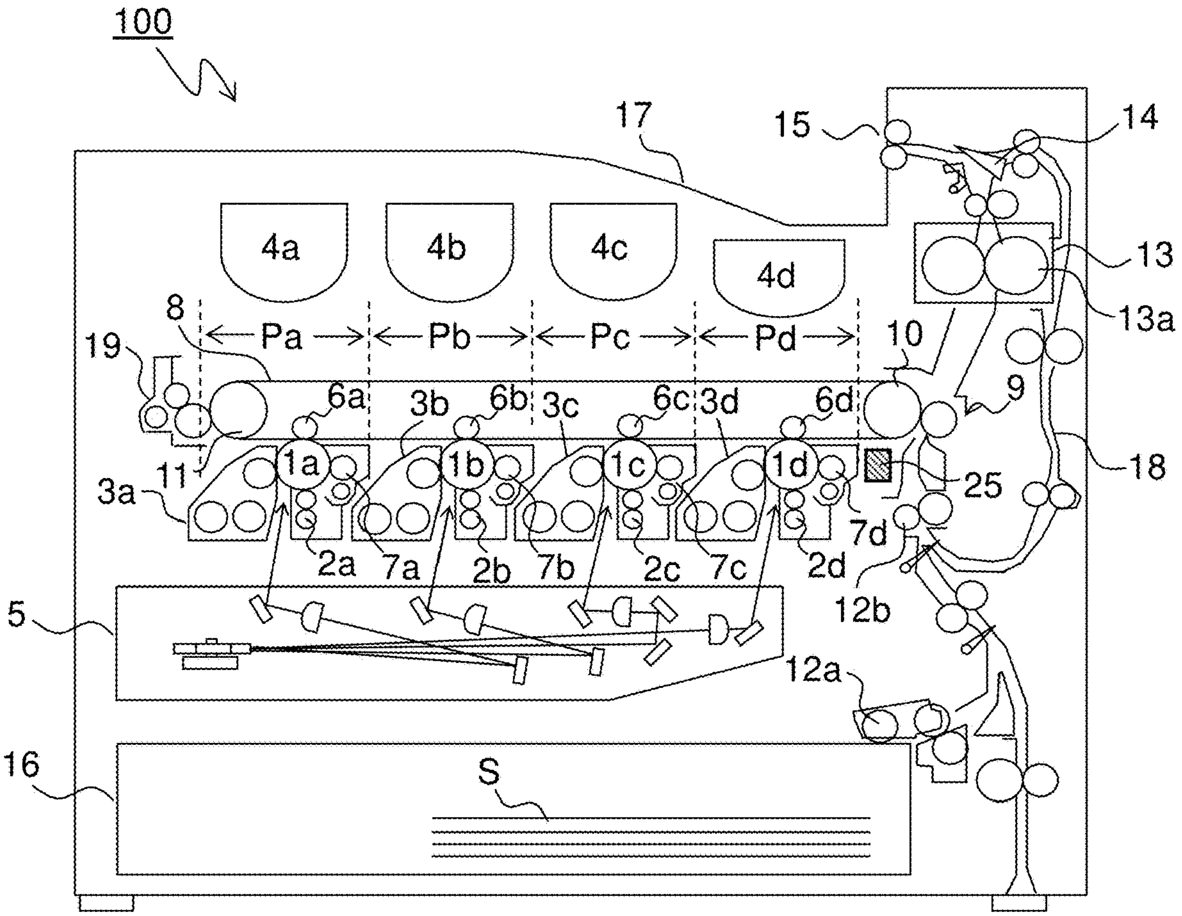
FIG. 1 is a schematic diagram showing the configuration inside an image forming apparatus according to an embodiment of the present disclosure.
Figure 2:
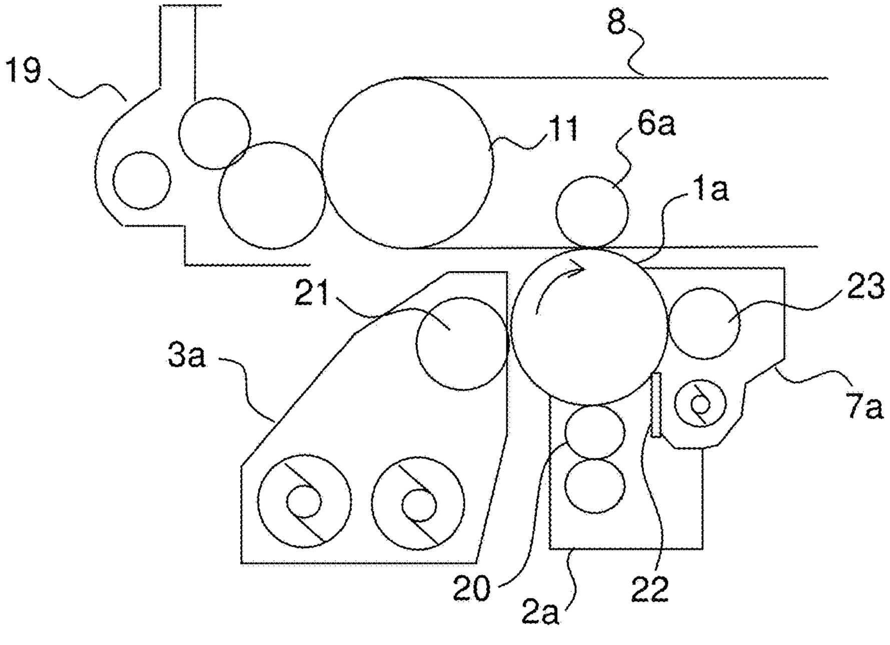
FIG. 2 is an enlarged view around an image forming portion in FIG. 1.

Hereinafter, an embodiment of the present disclosure will be described with reference to the drawings. FIG. 1 is a schematic diagram showing the configuration of an image forming apparatus 100 according to an embodiment of the present disclosure and FIG. 2 is an enlarged view around an image forming portion Pa in FIG. 1.

The image forming apparatus 100 shown in FIG. 1 is what is called a tandem-type color printer and has a configuration as follows. In a main body of the image forming apparatus 100, four image forming portions Pa, Pb, Pc, and Pd are arranged in this order from upstream (left side in FIG. 1) in the conveyance direction. The image forming portions Pa to Pd are provided so as to correspond to images of four different colors (yellow, cyan, magenta, and black) and sequentially form yellow, cyan, magenta, and black images, each through processes of electrostatic charging, exposure to light, image development, and image transfer.

In the image forming portions Pa to Pd are arranged photosensitive drums 1*a*, 1*b*, 1*c*, and 1*d*, which carry visible images (toner images) of different colors. An intermediate transfer belt 8 that rotates counterclockwise in FIG. 1 is provided adjacent to the image forming portions Pa to Pd. The toner images formed on the photosensitive drums 1*a* to 1*d* are transferred sequentially to the intermediate transfer belt 8 which moves while in contact with the photosensitive drums 1*a* to 1*d* and are then transferred all at once at a secondary transfer roller 9 to a sheet S as an example of a recording medium. The sheet S having the toner images transferred to it, after the toner images are fixed in a fixing portion 13, is discharged out of the main body of the image forming apparatus 100. While the photosensitive drums 1*a* to 1*d* are rotating clockwise in FIG. 1, an image forming process is performed with respect to each of the photosensitive drums 1*a* to 1*d*.

The sheet S to which the toner images are to be transferred is stored inside a sheet cassette 16 arranged in a bottom part in the main body of the image forming apparatus 100 and is conveyed via a sheet feed roller 12*a* and a pair of registration rollers 12*b* to the secondary transfer roller 9. The intermediate transfer belt 8 is typically an endless (seamless) belt.

Next, the image forming portions Pa to Pd will be described. The image forming portion Pa will be described in detail below and the image forming portions Pb to Pd, which have basically a similar structure to it, will be omitted from description. As shown in FIG. 2, around the photosensitive drum 1*a*, there are provided a charging device 2*a*, development device 3*a*, and a cleaning device 7*a* along the drum rotation direction (clockwise in FIG. 2), and there is arranged a primary transfer roller 6*a* across the intermediate transfer belt 8. Upstream of the photosensitive drum 1*a* in the rotation direction of the intermediate transfer belt 8, a belt cleaning unit 19 is arranged to face a tension roller 11 with the intermediate transfer belt 8 in between.

Next, the image forming process in the image forming apparatus 100 will be described. When the user enters a command to start image formation, first, a main motor 61 (see FIG. 4) starts rotating the photosensitive drums 1*a* to 1*d* and charging rollers 20 in the charging devices 2*a* to 2*d* electrostatically charge the surfaces of the photosensitive drums 1*a* to 1*d* uniformly. Next, the exposure device 5 irradiates the surfaces of the photosensitive drums 1*a* to 1*d* with beam light (laser light) to form on them electrostatic latent images according to an image signal.

The development devices 3*a* to 3*d* are loaded with predetermined amounts of toner of different colors, namely yellow, cyan, magenta, and black respectively. When, as image formation proceeds as will be described later, the proportion of the toner in the two-component developer in the development devices 3*a* to 3*d* falls below a prescribed value, toner is supplied from toner containers 4*a* to 4*d* to the development devices 3*a* to 3*d*. The toner in the developer is fed from development rollers 21 in the development devices 3*a* to 3*d* to the photosensitive drums 1*a* to 1*d* and electrostatically adhere to them. Thus, toner images are formed according to the electrostatic latent images formed by exposure to light from the exposure device 5.

Then, primary transfer rollers 6*a* to 6*d* apply an electric field at a predetermined transfer voltage between the primary transfer rollers 6*a* to 6*d* and the photosensitive drums 1*a* to 1*d*, and thereby the yellow, cyan, magenta, and black toner images on the photosensitive drums 1*a* to 1*d* are primarily transferred to the intermediate transfer belt 8. These images of four colors are formed with a predetermined positional relationship so as to form a predetermined full-color image. After that, in preparation for the subsequent formation of new electrostatic latent images, the toner remaining on the surfaces of photosensitive drums 1*a* to 1*d* is removed by cleaning blades 22 and rubbing rollers 23 in cleaning devices 7*a* to 7*d*.

As the driving roller 10 is rotated by a belt driving motor 63 (see FIG. 4), the intermediate transfer belt 8 starts rotating counterclockwise; then the sheet S is conveyed with predetermined timing from the pair of registration rollers 12*b* to the secondary transfer roller 9 provided next to the intermediate transfer belt 8 and a full-color image is transferred to the sheet S. The sheet S having the toner images transferred to it is conveyed to the fixing portion 13. The toner remaining on the surfaces of the intermediate transfer belt 8 is removed by the belt cleaning unit 19.

The sheet S conveyed to the fixing portion 13 is heated and pressed by a pair of fixing rollers 13*a*; thus the toner images are fixed to the surface of the sheet S and a predetermined full-color image is formed. The sheet S with the full-color image formed on it then has its conveyance direction switched by a branching portion 14 that branches into a plurality of directions, so as to be discharged as it is (or after being diverted to a duplex conveyance passage 18 to have images printed on both sides) to a discharge tray 17 by a pair of discharge rollers 15.

At a position facing the driving roller 10 across the intermediate transfer belt 8, an image density sensor 25 is arranged. Typically used as the image density sensor 25 is an optical sensor that includes a light-emitting element such as an LED and a light-receiving element such as a photodiode. When the amount of toner adhered on the intermediate transfer belt 8 is measured, irradiating a patch image (reference image) formed on the intermediate transfer belt 8 with measuring light from the light-emitting element irradiates results in the measuring light entering the light-receiving element as light reflected from the toner plus light reflected from the surface of the belt.

The light reflected from the toner and the surface of the belt includes specularly reflected light and diffusely reflected light. After the specularly and diffusely reflected light are split with a polarizing splitter prism, each enters a different light-receiving element. The light-receiving elements photoelectrically convert the received specularly and diffusely reflected light and feed output signals to a control portion 90 (see FIG. 4).

Based on changes in the characteristics of the output signals with respect to the specularly and diffusely reflected light, the image density (the amount of toner) and the position of the patch image are detected and are compared with a prescribed reference density and a prescribed reference position; then through adjustment of the characteristics values of the developing voltage, the exposure start position and timing of the exposure device 5, and the like, image density correction and color deviation correction (calibration) are performed for different colors.

Figure 3:
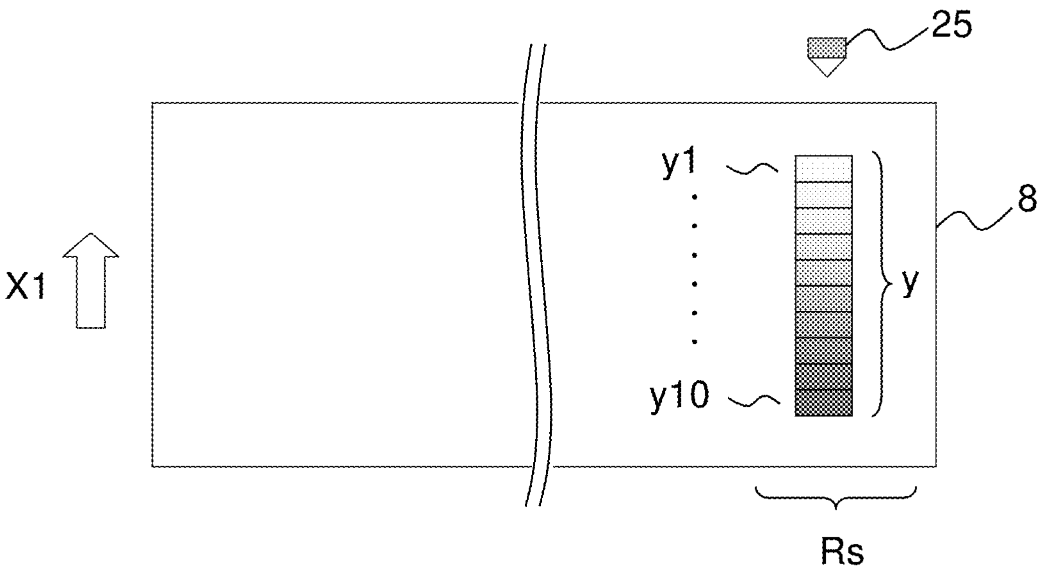
FIG. 3 is a diagram showing an example of a reference image for image density correction.

FIG. 3 is a diagram showing an example of the patch image (reference image) for image density correction. At one side (right side) of a reference image forming area Rs on the intermediate transfer belt 8, a reference image y comprising patch images y1 to y10 of 10 levels of density from a lightest color image y1 to a darkest color image y10 is formed in a row from downstream along the belt traveling direction (arrow X1 direction). Adjacent patch images are formed in a single color so that its density changes at the boundary. While here the yellow reference image y is described as an example, the cyan, magenta, and black reference images c, m, and k each have quite a similar structure.

The amounts of toner adhered (toner densities) on the reference images y to k are detected by the image density sensor 25, and are compared with a predetermined standard density; then the mean value of the differences in density between those toner densities and the standard density is calculated. According to the calculated mean value of the differences in density, a parameter value for density correction is determined as will be described later, and density correction is performed for different colors.

Figure 4:
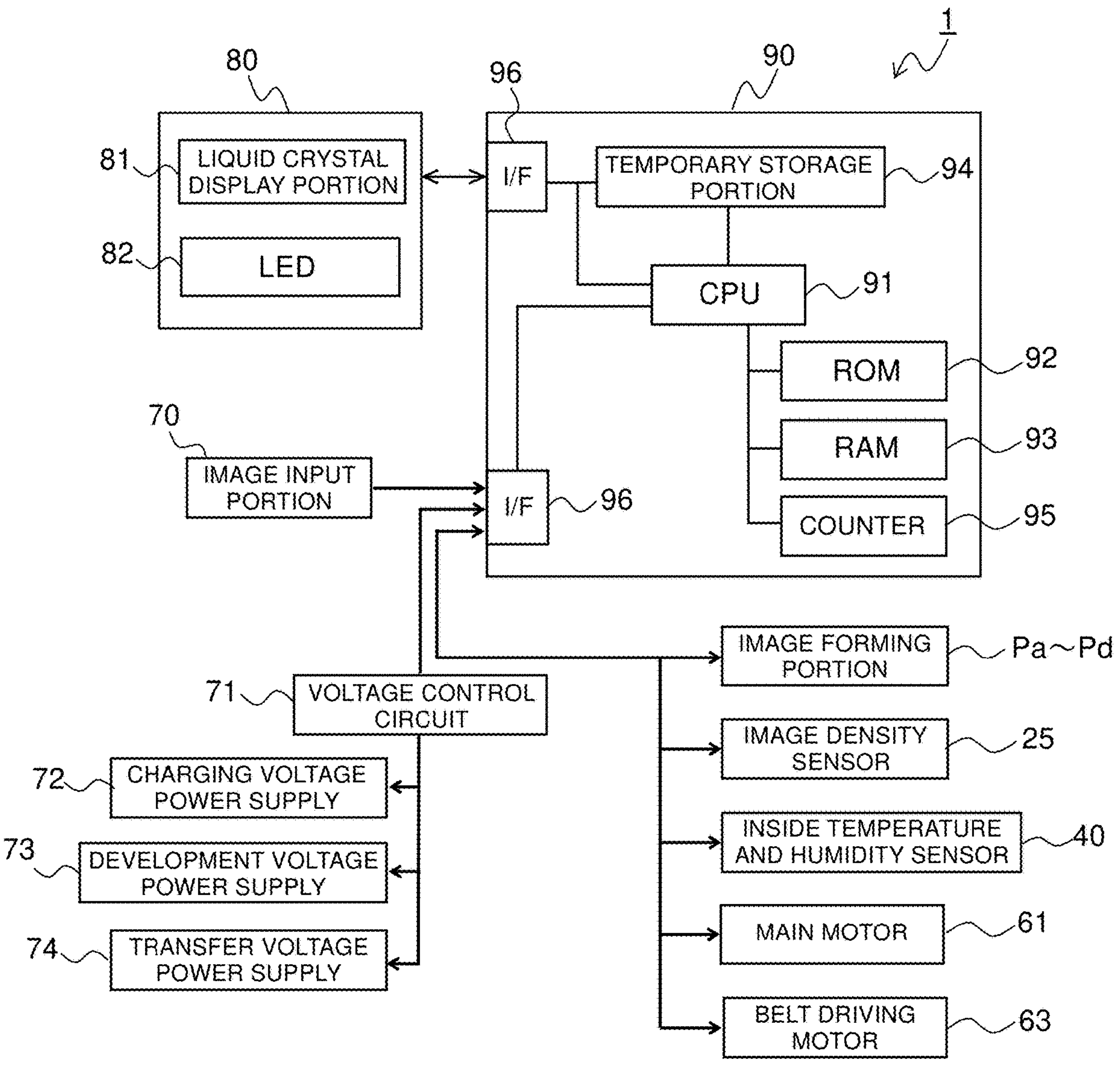
FIG. 4 is a block diagram showing an example of control paths in the image forming apparatus according to the embodiment.

FIG. 4 is a block diagram showing an example of control paths in the image forming apparatus 100 according to the embodiment. When the image forming apparatus 100 is used, different parts of the apparatus are controlled in various ways, so the control paths in the entire image forming apparatus 100 are complicated. The following description focuses on those of the control paths which are essential in implementing the present disclosure.

The control portion 90 at least includes a CPU (central processing unit) 91 as a central arithmetic processor, a ROM (read only memory) 92 as a read-only storage portion, a RAM (random access memory) 93 as a readable and rewritable storage portion, a temporary storage portion 94 that temporarily stores image data and the like, a counter 95, and a plurality of (here, two) I/Fs (interfaces) 96 that transmit control signals to different blocks in the image forming apparatus 100 and receive input signals from an operation portion 80. The control portion 90 can be arranged anywhere inside the main body of the image forming apparatus 100.

The ROM 92 stores a control program for the image forming apparatus 100 as well as data that are not changed during the use of the image forming apparatus 100, such as values necessary for control. The RAM 93 stores necessary data generated in controlling the image forming apparatus 100, data temporarily required in controlling the image forming apparatus 100, and the like. The RAM 93 (or the ROM 92) stores an image density correction table, a look-up table, and the like that are used in calibration. The counter 95 counts the cumulative number of printed sheets.

The control portion 90 transmits control signals from the CPU 91 via the I/Fs 96 to different parts and blocks in the image forming apparatus 100. From those parts and blocks, signals indicating their states and input signals are transmitted via the I/Fs 96 to the CPU 91. Examples of the parts and blocks controlled by the control portion 90 include the image forming portions Pa to Pd, the image density sensor 25, an inside temperature and humidity sensor 40, the main motor 61, a belt driving motor 63, the image input portion 70, a voltage control circuit 71, and the operation portion 80.

The inside temperature and humidity sensor 40 senses the temperature and humidity inside the image forming apparatus 100, in particular, the temperature and humidity around the development devices 3_a_ to 3_d_ in the image forming portions Pa to Pd. The results of the sensing are transmitted to the control portion 90.

The image input portion 70 is a receiving portion that receives image data transmitted from a host device such as a personal computer to the image forming apparatus 100. The image signal received by the image input portion 70 is converted into a digital signal, and is then fed to the temporarily storage portion 94.

The voltage control circuit 71 is connected to a charging voltage power supply 72, a development voltage power supply 73, and a transfer voltage power supply 74 and, according to output signals from the control portion 90, makes these power supplies operate. These power supplies operate according to control signals from the voltage control circuit 71 as follows. The charging voltage power supply 72 feeds a predetermined charging voltage to the charging rollers 20 in the charging devices 2_a_ to 2_d_. The development voltage power supply 73 feeds a predetermined development voltage having an alternating-current voltage overlaid on a direct-current voltage to the development rollers 21 in the development devices 3_a_ to 3_d_. The transfer voltage power supply 74 feeds a predetermined transfer voltage to the primary transfer rollers 6_a_ to 6_d_ and another to the secondary transfer roller 9.

The operation portion 80 includes a liquid crystal display portion 81 and LEDs 82 that indicate various states. The user operates a stop/clear button on the operation portion 80 to stop image formation and operates a reset button to restore various settings of the image forming apparatus 100 in a default state. The liquid crystal display portion 81 is configured to indicate the state of the image forming apparatus 100, the progress of image formation, and the number of copies printed. The various settings of the image forming apparatus 100 are made from a printer driver on the personal computer.

Hereinafter, as a distinctive feature of the present disclosure, a procedure for adjusting the timing of performing image density correction in the image forming portions Pa to Pd will be described. The image forming apparatus 100 according to the embodiment, when performing image density correction, predicts the amount of charge on toner (toner charge amount) based on the conditions of reference image formation and the density of the reference image detected by the image density sensor 25. Then, based on the rate of change of the toner charge amount calculated according to the toner charge amount predicted during image density correction performed last time and this time, and the interval between image density correction performed last time and this time, the timing of performing image density correction next time is determined. The procedure for adjusting the timing of performing image density correction will be described in detail below.

(Prediction of the Toner Charge Amount)

When image density correction is performed, a plurality of reference images y to k (see FIG. 3) on which stepwise varying amounts of toner is adhered are formed on the intermediate transfer belt 8. Then, the formed reference images y to k are read by the image density sensor 25 and the image formation conditions such as the charging voltage, the development voltage, and the amount of exposure from the exposure device 5 are set so that the image density equals the target density.

Meanwhile, the toner charge amount can be predicted based on the conditions of reference image formation such as the charging voltage fed to the charging rollers 20 in the charging devices 2_a_ to 2_d_, the development voltage (direct-current voltage) fed to the development rollers 21 in the development devices 3_a_ to 3_d_, the amount of exposure from the exposure device 5 as well as the image density of the reference images detected by the image density sensor 25.

Specifically, a simulation model that reproduces a formation state of the reference images is stored in advance in the RAM 93 (or in the ROM 92). Then an inverse function formula for calculating the toner charge amount is derived based on the image formation conditions determined from the simulation model and the image density of the reference images. By inputting the formation conditions of the reference images and the image density of the reference images detected by the image density sensor 25 to the derived inverse function formula, it is possible to calculate a prediction value of the toner charge amount.

Instead of the method deriving the inverse function formula as described above, data for conversion correction (table data) derived from the simulation model can be stored in the RAM 93 (or in the ROM 92). In this case, by inputting the formation conditions of the reference images and the image density of the reference images detected by the image density sensor 25 to the data for conversion correction, it is possible to calculate a prediction value of the toner charge amount.

(Determination of the Timing of Performing the Image Density Correction)

The prediction of the toner charge amount described above is performed every time image density correction is performed. The timing of performing image density correction next time is determined according to the rate of change of the toner charge amount. Specifically, the rate of change of the toner charge amount is acquired based on the toner charge amount (a first toner charge amount) predicted during image density correction performed last time, the toner charge amount (a second toner charge amount) predicted during image density correction performed this time, and the interval (the lapse of time or the number of sheets printed) between image density correction performed last time and this time.

Figure 5:
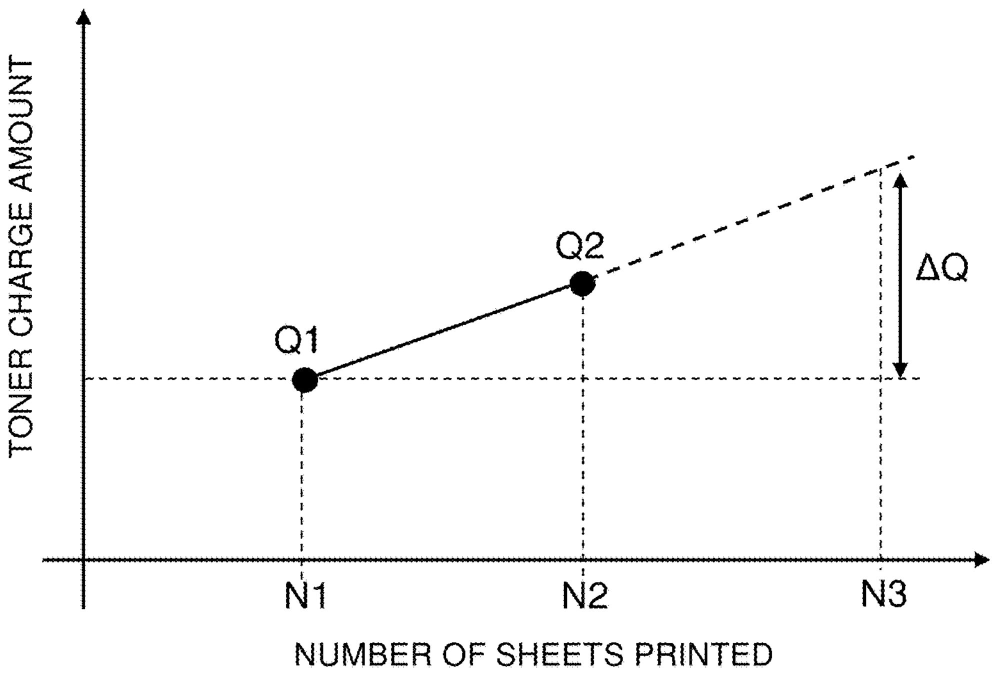
FIG. 5 is a graph showing a method for determining the timing of performing image density correction next time from the number of sheets printed and the toner charge amount during image density correction.

FIG. 5 is a graph showing a relation of the number of sheets printed with the toner charge amount during the image density correction. Based on the difference between the first toner charge amount Q1 and the second toner charge amount Q2, that is, Q2−Q1, and the number of sheets printed after image density correction last time until image density correction this time, that is, N2−N1, the rate of change of the toner charge amount (Q2−Q1)/(N2−N1) is acquired.

According to a prediction line (broken line in FIG. 5) of the change of the toner charge amount at the acquired rate of change, a timing at which the toner charge amount is predicted to change by a predetermined threshold value ΔQ, that is, a timing at which the number of sheets printed reaches N3 is determined as the timing of performing image density correction next time. The second toner charge amount Q2 is used as the first toner charge amount Q1 when image density correction is performed next time to determine the timing of image density correction next but one time. The above process is repeated every time image density correction is performed and the timing of performing image density correction next time is determined.

In this way, the change of the toner charge amount, which is the physical property of toner that is the main factor in image density change, can be exploited to determine an appropriate timing of performing image density correction. It is thus possible to prevent defective image density due to a long interval between executions of image density correction, low image formation efficiency and unnecessary toner consumption due to a short interval between executions of image density correction.

The timings of performing image density correction first and second times cannot be determined such that they reflect a change in the toner charge amount. Thus, image density correction is performed first and second times at a prescribed interval. The threshold value ΔQ of the change of the toner charge amount with which to determine the timing of performing image density correction next time need not be constant but may be changed according to the absolute value of the toner charge amount. For example, as the absolute value of the toner charge amount increases, its effect on image density change is stronger; in view of that, as the absolute value of the toner charge amount increases, the threshold value ΔQ can be reduced to shorten the interval between executions of image density correction.

(Correction of the Timing of Performing Image Density Correction)

After the timing of performing image density correction next time is determined, before image density correction is performed next time, if such a change in conditions is detected as may change the rate of change (slope) of the toner charge amount, the timing of performing is corrected. Changes in conditions that trigger correction include changes in the rate of printing of the output image, in the toner concentration (ratio of toner to carrier, T/C) in two-component developer, and in the use environment (temperature and humidity) of the image forming apparatus 100. If any of these triggers changes by a given threshold value, the timing of performing image density correction is corrected.

Specifically, for each condition that triggers correction, a rate of change (correction coefficient) a is set according to the amount of change. As shown in Formula (1) below, multiplying the uncorrected interval Ts between executions of image density correction by the correction coefficient α gives the corrected interval Tc.

$$Tc = Ts \times \alpha \tag{1}$$

If the change in conditions that triggers correction is in the direction of promoting an increase in the toner charge amount, α is smaller than one and the corrected interval Tc is shorter than Ts; so the prediction line of the change of the amount of charge has a steeper gradient. By contrast, if the change in conditions that triggers correction is in the direction of suppressing an increase in the toner charge amount, α is greater than one and the corrected interval Tc is longer than Ts; so the prediction line of the change of the amount of charge has a gentler gradient.

If the acquired corrected interval Tc is too long or too short, it may lead to defective image density and low image formation efficiency. Thus, the corrected interval Tc may be limited with an upper limit value and a lower limit value.

When the timing of performing image density correction is corrected, according to the toner charge amount calculated during image density correction performed last time and the number of sheets printed until a trigger of correction is detected, the toner charge amount at the time (point P) when the trigger of correction is detected is predicted. The predicted toner charge amount at point P (a third toner charge amount Q3) is stored instead of (to overwrite) the second toner charge amount Q2 on toner predicted when image density correction was performed last time. The interval at which to perform image density correction next time after image density correction performed last time is an interval after the time when the trigger of correction is detected (the time when the timing of performing is corrected).

Figure 6:
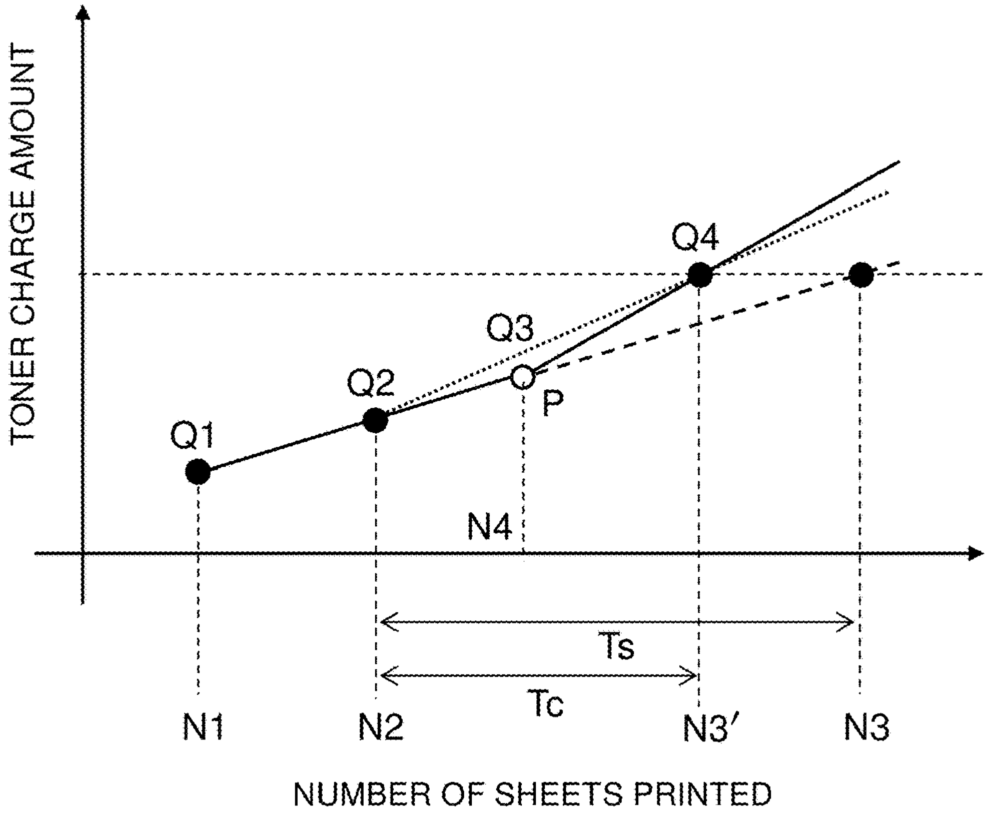
FIG. 6 is a graph showing prediction lines of the change of the amount of charge observed if the timing of performing image density correction is not corrected, if the timing of performing is corrected but the corrected toner charge amount is not reflected, and if the timing of performing is corrected and the corrected toner charge amount is reflected.

FIG. 6 is a graph showing prediction lines of the change of the amount of charge observed if the timing of performing image density correction is not corrected, if the timing of performing is corrected but the toner charge amount at the time of correction is not reflected in the prediction of the change of the toner charge amount, and if the timing of performing is corrected and the toner charge amount at the time of correction is reflected in the prediction of the change of the toner charge amount.

As shown in FIG. 6, assume that a trigger of correction is detected in the direction of promoting an increase in the toner charge amount at point P (the number of sheets printed N4) after image density correction performed last time (the number of sheets printed N2) before image density correction performed next time. In this case, multiplying the uncorrected interval Ts of image density correction by a correction coefficient α according to the detected trigger of correction gives the corrected interval Tc. As a result, the corrected timing of performing image density correction next time (the number of sheets printed N3') is earlier than the uncorrected timing (the number of sheets printed N3) of performing image density correction next time.

The toner charge amount at point P is predicted and the so predicted toner charge amount (a third toner charge amount Q3) is taken to overwrite the second toner charge amount Q2 predicted when image density correction was performed last time. If the number of sheets printed reaches N3' and then image density correction is performed next time, based on the predicted toner charge amount Q4, the difference Q4−Q3 from the third toner charge amount Q3, and the number of sheets N3'−N4 printed after point P where the trigger of correction was detected until image density correction this time, the rate of change of the toner charge amount (Q4−Q3)/(N3'−N4) is acquired. In this way, a prediction line (indicated by a solid line in FIG. 6) of the change of the toner charge amount is obtained with the timing of performing corrected and the corrected toner charge amount reflected.

By contrast, if the timing of performing image density correction is not corrected at point P, a prediction line (indicated by a broken line in FIG. 6) of the change of the toner charge amount does not change, so the timing of performing image density correction next time is delayed from an appropriate timing.

If the rate of change of the toner charge amount (Q4−Q2)/(N3'−N2) is acquired based on the difference Q4−Q2 between the toner charge amount Q4 at the time of image density correction this time and the toner charge amount Q2 at the time of image density correction last time, and the number of sheets N3'−N2 printed after image density correction last time until image density correction this time, the timing of performing image density correction next time is corrected but the toner charge amount at point P where the trigger of correction was detected is not reflected in the prediction of the change of the toner charge amount. Thus, the prediction line (indicated by a dotted line in FIG. 6) of the change of the toner charge amount has a gradient gentler than it actually has and the timing of performing image density correction cannot thereafter be appropriately determined.

Figure 7:
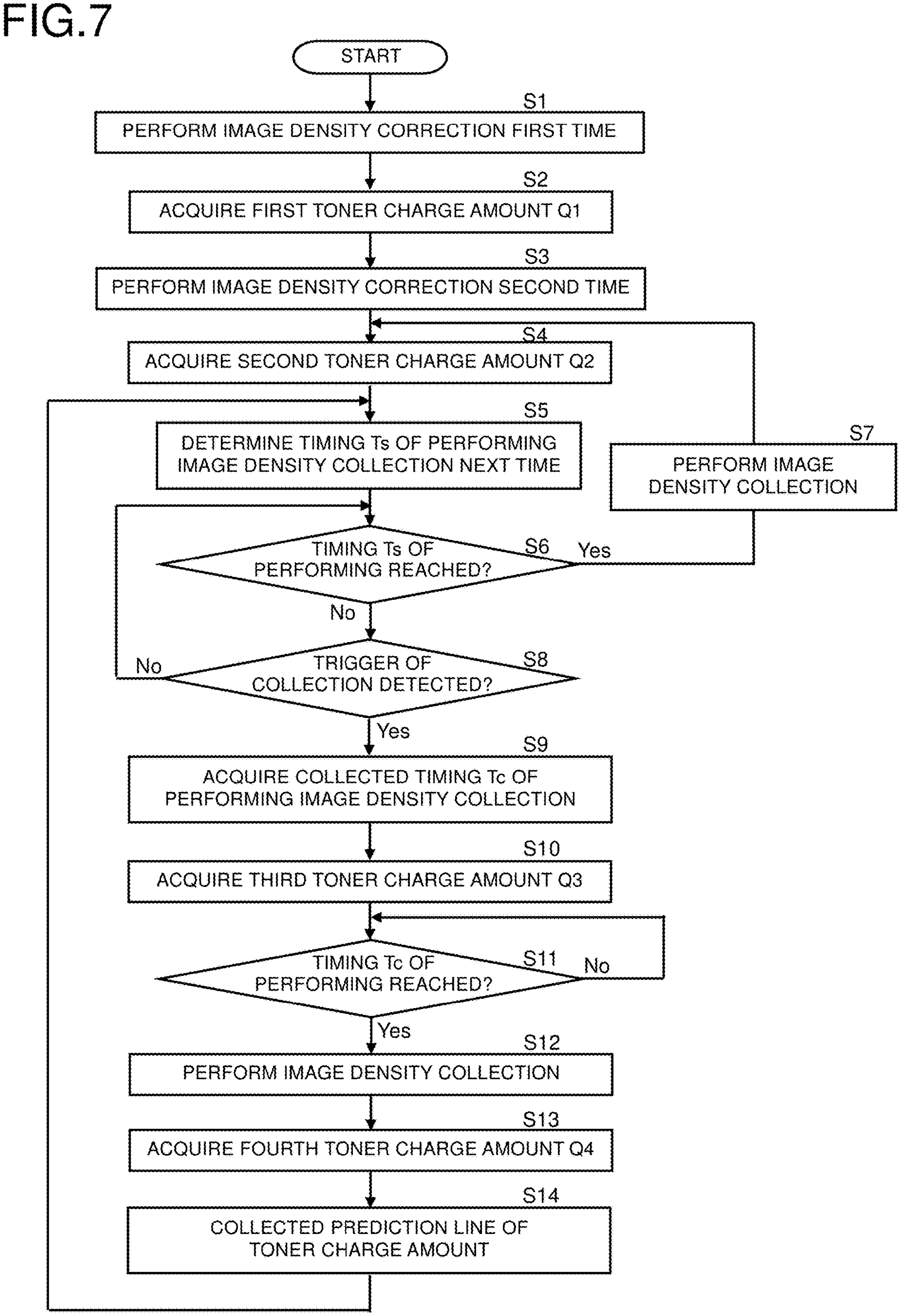
FIG. 7 is a flow chart showing an example of adjusting the timing of performing image density correction in the image forming apparatus according to the embodiment.

FIG. 7 is a flow chart showing an example of adjusting the timing of performing image density correction in the image forming apparatus 100 according to the embodiment. With reference to FIGS. 1 to 6 as necessary, the procedure for adjusting the timing of performing image density correction will be described along the steps in FIG. 7.

First, at the timing (the number of sheets printed N1) of performing image density correction first time, the control portion 90 performs image density correction (step S1). Based on the image density of the reference images detected by the image density sensor 25 and the simulation model or data for conversion correction stored in the RAM 93 (or the ROM 92), the first toner charge amount Q1 is acquired (step S2).

Next, at the timing (the number of sheets printed N2) of performing image density correction second time, the control portion 90 performs image density correction (step S3). Then, the second toner charge amount Q2 is acquired by the same method as in step S2 (step S4).

Next, the control portion 90 determines the timing Ts of performing image density correction next time (step S5). Specifically, based on the difference Q2−Q1 between the first toner charge amount Q1 and the second toner charge amount Q2 acquired in steps S2 and S4 and the number of sheets N2−N1 printed after the first-time image density correction until the second-time image density correction, the rate of change of the toner charge amount (Q2−Q1)/(N2−N1) is acquired.

According to a prediction line (broken line in FIG. 5) of the change of the toner charge amount at the acquired rate of change, a timing at which the toner charge amount is predicted to change by a predetermined threshold value ΔQ is determined as the timing Ts of performing image density correction next time. Then the second toner charge amount Q2 is stored to overwrite the first toner charge amount Q1.

Next, the control portion 90 checks whether the timing Ts of performing image density correction has been reached (step S6). If the timing Ts of performing has been reached (Yes in step S6), image density correction is performed (step S7). Then, a return is made to step S4, the second toner charge amount Q2 is acquired, the timing of performing image density correction next time is determined, and then the second toner charge amount Q2 is taken to overwrite the first toner charge amount Q1 (steps S4 to S5).

If the timing Ts of performing has not been reached (No in step S6), whether a trigger of correction has been detected is checked (step S8). If no trigger of correction has been detected (No in step S8), a return is made to step S6 and the check of whether the timing Ts of performing image density correction has been reached is continued.

If a trigger of correction is detected in step S8 (Yes in step S8), the corrected timing Tc of performing image density correction is acquired (step S9). Specifically, the timing Ts of performing is multiplied by the correction coefficient α determined for each trigger of correction to calculate the corrected timing Tc of performing. Also the third toner charge amount Q3 at the time when the trigger of correction is detected is acquired (step S10).

Next, the control portion 90 checks whether the corrected timing Tc of performing has been reached (step S11). If the timing Tc of performing has been reached (Yes in step S11), image density correction is performed (step S12). Then, the fourth toner charge amount Q4 is acquired by the same method as in steps S2 and S4 (step S13).

Next, the control portion 90 corrects the prediction line of the change of the toner charge amount (step S14). Specifically, as shown in FIG. 6, when the timing Tc (the number of sheets printed N3') of performing is reached and image density correction is performed, based on the difference Q4−Q3 between the acquired fourth toner charge amount Q4 and the third toner charge amount Q3 at the time when the trigger of correction was detected and the number of sheets N3'−N4 printed after the number of sheets N4 printed at the time when the trigger of correction was detected until image density correction this time, the rate of change of the toner charge amount (Q4−Q3)/(N3'−N4) is acquired and, based on the acquired rate of change of the toner charge amount, the prediction line of the change of the toner charge amount is corrected (a solid line in FIG. 6).

Then, a return is made to step S5, where, with the third and fourth toner charge amounts Q3 and Q4 taken as the first and second toner charge amounts Q1 and Q2 respectively, the timing Ts of performing image density correction next time is determined; after that, similar steps are repeated (steps S4 to S14).

According to the example of control shown in FIG. 7, the change of the toner charge amount can be exploited to determine an appropriate timing of performing image density correction. It is thus possible to prevent defective image density due to a long interval between executions of image density correction, low image formation efficiency and unnecessary toner consumption due to a short interval between executions of image density correction.

Before image density correction is performed next time, if a change is detected such as a change in the rate of printing of the output image, in the toner concentration (ratio of toner to carrier, T/C) in two-component developer, or in the use environment (temperature and humidity) of the image forming apparatus 100, the timing of performing image density correction and the prediction line of the change of the toner charge amount are corrected. In this way, the timing of performing image density correction can be determined more accurately according to a change in the toner charge amount.

The toner charge amount is predicted using the image density of the reference images formed during image density correction, so there is no need to additionally provide a mode for measurement of the toner charge amount. Thus, the timing of performing image density correction can be determined by acquiring the toner charge amount without lowering image formation efficiency (productivity).

The present disclosure is not limited to the above embodiments and can be carried out with any modifications made without departure from the spirit of the preset disclosure. For example, while the above embodiments deal with an image forming apparatus 100 that incorporates two-component development devices 3*a* to 3*d* that use a two-component developer containing magnetic carrier and toner, the present disclosure is also applicable to an image forming apparatus incorporating a development device that adopts a magnetic one-component development method using magnetic toner or a non-magnetic one-component development method using non-magnetic toner.

The present disclosure is applicable not only to a tandem-type color printer like the one shown in FIG. 1 but also to any other types of image forming apparatuses such as monochrome printers, monochrome copiers, digital multifunction peripherals, color copiers, and color multifunction peripherals.

The present disclosure can be used in image forming apparatuses using an electrophotographic process. Based on the present disclosure, it is possible to provide an image forming apparatus that can optimize the timing of performing image density correction regardless of the use environment or printing conditions.

What is claimed is:

1. An image forming apparatus comprising:

an image forming portion including:
  an image carrier that has a photosensitive layer formed on a surface thereof;
  a charging device that charges the surface of the image carrier; and
  a development device that includes a developer carrier which carries developer including toner, the development device developing an electrostatic latent image formed on the image carrier into a toner image,
  the image forming portion performing image formation using the toner;
an exposure device that forms the electrostatic latent image with an attenuated electric charge by exposing to light the surface of the image carrier charged by the charging device;
an image density sensor that detects a density of the toner image formed in the image forming portion and transferred to an intermediate transfer belt; and
a control portion that controls the image forming portion and the exposure device,
wherein
the control portion can, by detecting with the image density sensor an image density of a reference image for image density correction formed in the image forming portion and adjusting a development voltage fed to the developer carrier and an amount of exposure from the exposure device based on a result of the detection, perform image density correction to adjust the image density in the image forming portion,
when performing the image density correction, the control portion
predicts a toner charge amount based on a formation condition of the reference image and the image density of the reference image detected by the image density sensor and
determines a timing of performing the image density correction next time based on a rate of change of the toner charge amount calculated using:
  a first toner charge amount predicted when the image density correction was performed last time;
  a second toner charge amount predicted when the image density correction is performed this time; and
  an interval between the image density correction performed last time and this time,
the image forming apparatus further includes a temperature and humidity detection device that senses a temperature and a humidity near the development device,
the control portion corrects the timing of performing the image density correction next time if, after the image density correction was performed last time, before the timing of performing the image density correction next time, a change equal to or more than a predetermined value occurs in at least one of
the temperature and the humidity sensed by the temperature and humidity detection device, and
a rate of printing of the image formed in the image density portion,
a correction coefficient corresponding to the rate of change of the toner charge amount is set for each of the temperature and the humidity sensed by the temperature and humidity detection device, and the rate of printing, and
the control portion corrects the timing of performing the image density correction by multiplying by the correction coefficient the timing of performing the image density correction next time.

2. The image forming apparatus according to claim 1, further comprising:

a storage portion that stores a simulation model that reproduces a formation state of the reference image or data for conversion correction derived from the simulation model,
wherein
the control portion, by inputting the image density of the reference image detected by the image density sensor to the simulation model or to the data for conversion correction, predicts the toner charge amount.

3. The image forming apparatus according to claim 1, wherein when correcting the timing of performing the image density correction next time, the control portion predicts the toner charge amount and sets the toner charge amount predicted as a third toner charge amount,
at the corrected timing of performing the image density correction, the control portion predicts the toner charge amount, sets the toner charge amount predicted as a fourth toner charge amount, and acquires the rate of change of the toner charge amount based on:
  the third toner charge amount predicted when the timing of performing is corrected;
  the fourth toner charge amount predicted when the image density correction is performed after correction; and
  an interval after correction of the timing of performing until the corrected timing of performing image density correction, and based on the acquired rate of change of the toner charge amount, the control portion corrects a prediction line of the change of the toner charge amount.

* * * * *